United States Patent
Kobayashi et al.

(10) Patent No.: US 8,681,249 B2
(45) Date of Patent: Mar. 25, 2014

(54) SOLID-STATE IMAGING DEVICE AND PORTABLE INFORMATION TERMINAL

(75) Inventors: Mitsuyoshi Kobayashi, Yokohama-shi (JP); Hideyuki Funaki, Tokyo (JP); Risako Ueno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 13/221,097

(22) Filed: Aug. 30, 2011

(65) Prior Publication Data
US 2012/0229683 A1 Sep. 13, 2012

(30) Foreign Application Priority Data
Mar. 8, 2011 (JP) ................................ 2011-050221

(51) Int. Cl.
*H04N 9/64* (2006.01)
*H04N 5/225* (2006.01)

(52) U.S. Cl.
USPC ............................ 348/246; 348/247; 348/335

(58) Field of Classification Search
None
See application file for complete search history.

(56) References Cited

U.S. PATENT DOCUMENTS

| | | | |
|---|---|---|---|
| 2009/0295829 A1* | 12/2009 | Georgiev et al. | 345/620 |
| 2010/0265381 A1* | 10/2010 | Yamamoto et al. | 348/335 |
| 2010/0283884 A1* | 11/2010 | Hayasaka et al. | 348/340 |
| 2011/0018970 A1* | 1/2011 | Wakabayashi | 348/47 |
| 2011/0019184 A1* | 1/2011 | Iwane | 356/123 |
| 2011/0129165 A1* | 6/2011 | Lim et al. | 382/255 |
| 2012/0057020 A1 | 3/2012 | Kobayashi et al. | |
| 2013/0127901 A1* | 5/2013 | Georgiev et al. | 345/620 |

FOREIGN PATENT DOCUMENTS

| | | |
|---|---|---|
| JP | 2000-236480 A | 8/2000 |
| JP | 2012-205014 A | 10/2012 |

OTHER PUBLICATIONS

U.S. Appl. No. 13/713,304, filed Dec. 13, 2012, Ueno et al.
U.S. Appl. No. 13/714,960, filed Dec. 14, 2012, Kobayashi, et al.
U.S. Appl. No. 13/361,293, Jan. 30, 2012, Kobayashi, et al.
U.S. Appl. No. 13/361,321, Jan. 30, 2012, Ueno, et al.
U.S. Appl. No. 13/530,595, Jun. 22, 2012, Ogasahara, et al.
Office Action issued Feb. 15, 2013, in Japanese Patent Application No. 2011-050221 with English translation.
U.S. Appl. No. 13/221,061, Aug. 30, 2011, Ueno, et al.
T. Georgiev et al., "Reducing Plenoptic Camera Artifacts", Computer Graphics forum, vol. 29, No. 6, 2010, pp. 1955-1968.

* cited by examiner

*Primary Examiner* — Lin Ye
*Assistant Examiner* — John H Morehead, III
(74) *Attorney, Agent, or Firm* — Oblon, Spivak, McClelland, Maier & Neustadt, L.L.P.

(57) ABSTRACT

A solid-state imaging device according to an embodiment includes: a first optical system configured to form an image of an object on an image formation plane; an imaging element comprising an imaging area which includes a plurality of pixel blocks each including a plurality of pixels; a second optical system configured to include a microlens array including a plurality of microlenses provided to correspond to the plurality of pixel blocks and reduce and re-form an image scheduled to be formed on the image formation plane, in a pixel block corresponding to an individual microlens; and a signal processing unit configured to perform image signal processing with an optical position relation between each microlens and the pixel block corrected, by using an image signal of the object obtained by the imaging element.

8 Claims, 14 Drawing Sheets

SOLID-STATE IMAGING DEVICE AND PORTABLE INFORMATION TERMINAL

CROSS-REFERENCE TO RELATED APPLICATION

This application is based upon and claims the benefit of priority from prior Japanese Patent Application No. 2011-50221 filed on Mar. 8, 2011 in Japan, the entire contents of which are incorporated herein by reference.

FIELD

Embodiments described herein relate generally to a solid-state imaging device and a portable information terminal.

BACKGROUND

As for imaging techniques which make it possible to obtain a distance in a depth direction as two-dimensional array information, various methods such as a technique using reference light and a stereo distance measurement technique using a plurality of cameras are being studied. Especially in recent years, needs for comparatively inexpensive products functioning as new input devices in public welfare use have increased.

As a distance imaging scheme in which reference light is not used to reduce a system cost, there is a triangulation scheme utilizing the parallax. In this scheme, stereo cameras and compound eye cameras are known. In these cases, a plurality of cameras are used, and there is a problem such as a gigantic system and a failure rate increase due to an increase of the number of parts.

In a proposed structure, a microlens array having a plurality of microlenses is disposed in an upper part of a pixel and a plurality of pixels are disposed in a lower part of each microlens. According to this structure, it is possible to acquire an image group having parallax by taking a pixel block as a unit. Owing to this parallax, refocus processing or the like based on distance estimation of an object and distance information becomes possible.

Since the structure has a plurality of microlenses, however, there is a problem that initial correction is difficult when an error is caused in the position relation of a microlens image by an error or distortion in an optical system such as an attachment error of the microlens array or distortion of an image formation lens, and an error and picture quality degradation occur in the distance estimation and image reconstruction. Furthermore, since the optical system is an optical system which is used for imaging of both a two-dimensional image and a three-dimensional image and which has the microlens array incorporated therein, it is difficult to apply ordinary correction means as it is.

DETAILED DESCRIPTION

A solid-state imaging device according to an embodiment includes: a first optical system configured to form an image of an object on an image formation plane; an imaging element comprising an imaging area which includes a plurality of pixel blocks each including a plurality of pixels; a second optical system configured to include a microlens array including a plurality of microlenses provided to correspond to the plurality of pixel blocks and reduce and re-form an image scheduled to be formed on the image formation plane, in a pixel block corresponding to an individual microlens; and a signal processing unit configured to perform image signal processing with an optical position relation between each microlens and the pixel block corrected, by using an image signal of the object obtained by the imaging element.

Hereafter, an embodiment will be described with reference to the drawings.

Figure 1:
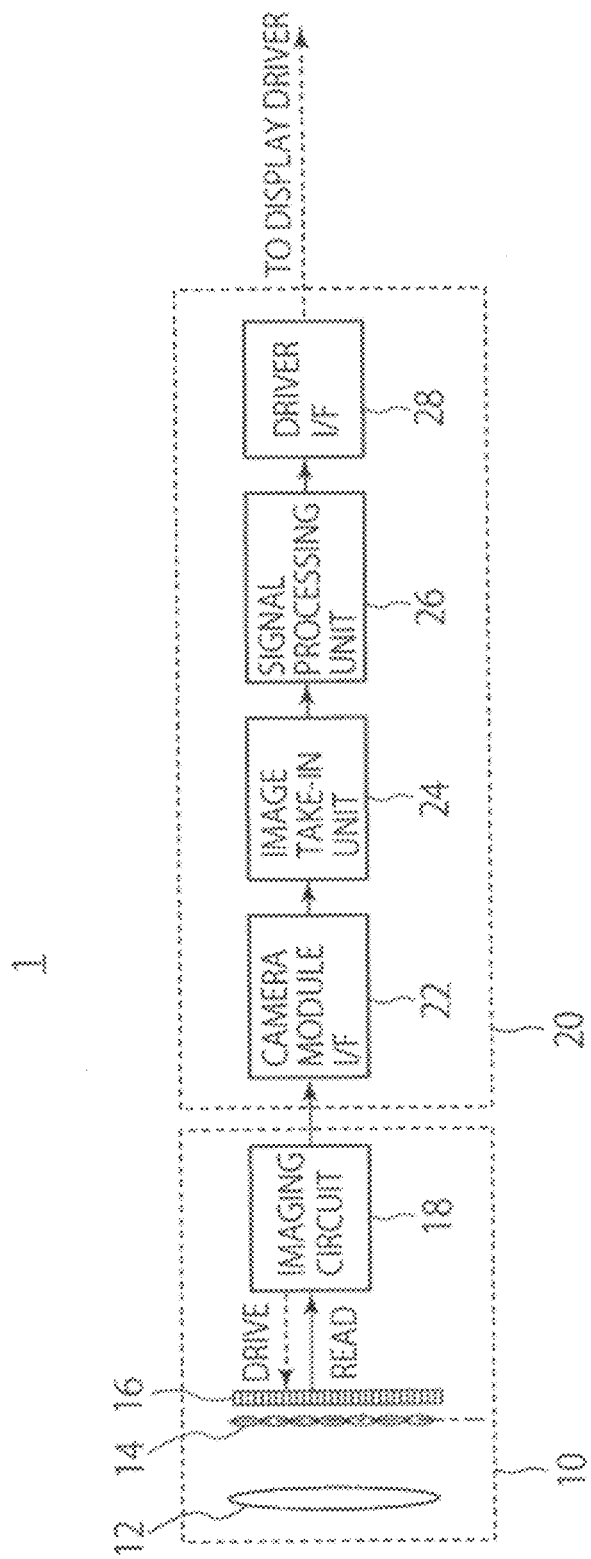
FIG. 1 is a block diagram showing a solid-state imaging device according to an embodiment.

FIG. 1 shows a solid-state imaging device (camera module) 1 according to an embodiment. The solid-state imaging device 1 in this embodiment includes an imaging module unit 10 and an image signal processor (hereafter referred to as ISP) 20.

The imaging module unit 10 includes an image formation optical system 12, a microlens array 14, an imaging element 16, and an imaging circuit 18. The image formation optical system 12 functions as an imaging optical system which takes light from an object into the imaging element 16. The imaging element 16 functions as an element which converts the light taken in by the image formation optical system 12 to signal charge. The imaging element 16 has a plurality of pixels (such as, for example, photodiodes serving as photoelectric conversion elements) arranged in a two-dimensional array form. The microlens array 14 is a minute optical system such as, for example, a microlens array having a plurality of microlenses or a prism. The microlens array 14 functions as an optical system which reduces a light ray group forming an image on an image formation plane by the action of the image formation optical system 12 and re-forms an image on a pixel block corresponding to an individual microlens. The imaging circuit 18 includes a drive circuit unit (not shown) for driving pixels in a pixel array of the imaging element 16, and a pixel signal processing circuit unit (not shown) for processing a signal which is output from a pixel region. The drive circuit unit includes, for example, a vertical selection circuit which successively selects driven pixels in the vertical direction by taking a horizontal line (row) as the unit, a horizontal selection circuit which successively selects a column as the unit, and a TG (timing generator) circuit which drives them with various pulses. The signal processing circuit unit includes an AD conversion circuit which performs digital conversion on an analog electric signal supplied from the pixel region, a gain adjustment/amplifier circuit which performs gain adjustment and amplification operation, and a digital signal processing circuit which performs digital signal processing.

The ISP 20 includes a camera module I/F (interface) 22, an image take-in unit 24, a signal processing unit 26, and a driver I/F 28. A raw image obtained by imaging in the imaging module unit 10 is taken into the image take-in unit 24 via the camera module I/F 22. The signal processing unit 26 executes signal processing on the raw image taken into the image take-in unit 24. The driver I/F (interface) 28 outputs the image signal subjected to signal processing in the signal processing unit 26 to a display driver which is not shown. The display driver displays the image picked up by the solid-state imaging device.

(Processing Procedure in Signal Processing Unit)

A procedure of signal processing in the signal processing unit 26 will now be described with reference to FIGS. 2 and 3. The signal processing unit 26 performs distortion correction and luminance correction of the optical system on the raw image obtained by the imaging module unit 10.

Figure 2:
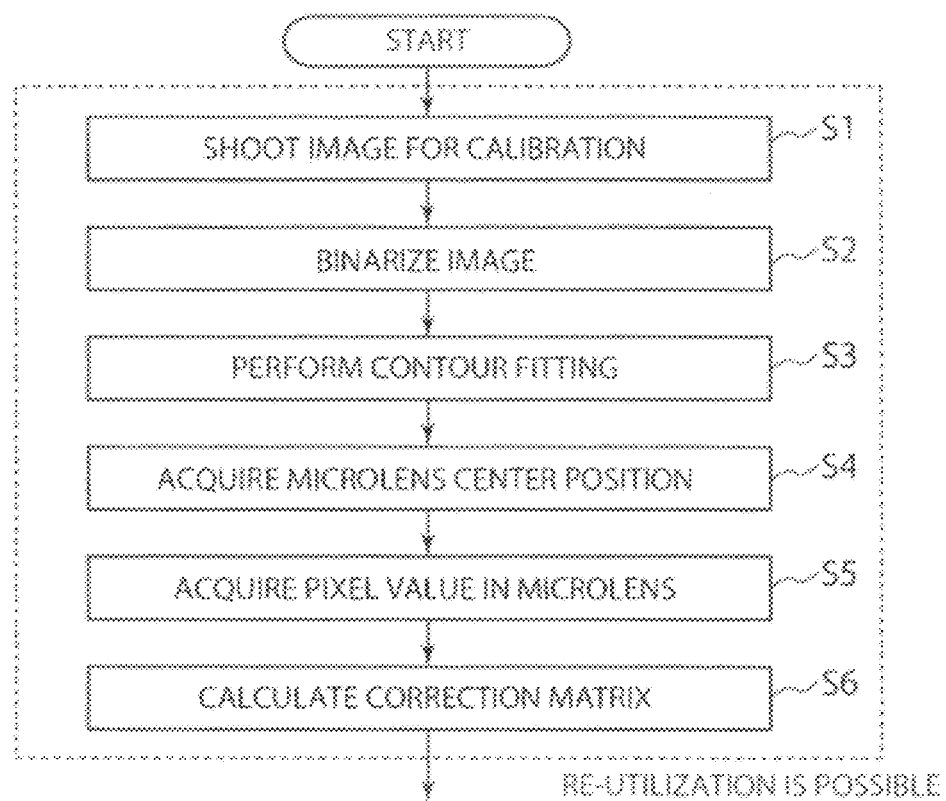
FIG. 2 is a flow chart showing a processing procedure of a signal processing unit.
Figure 3:
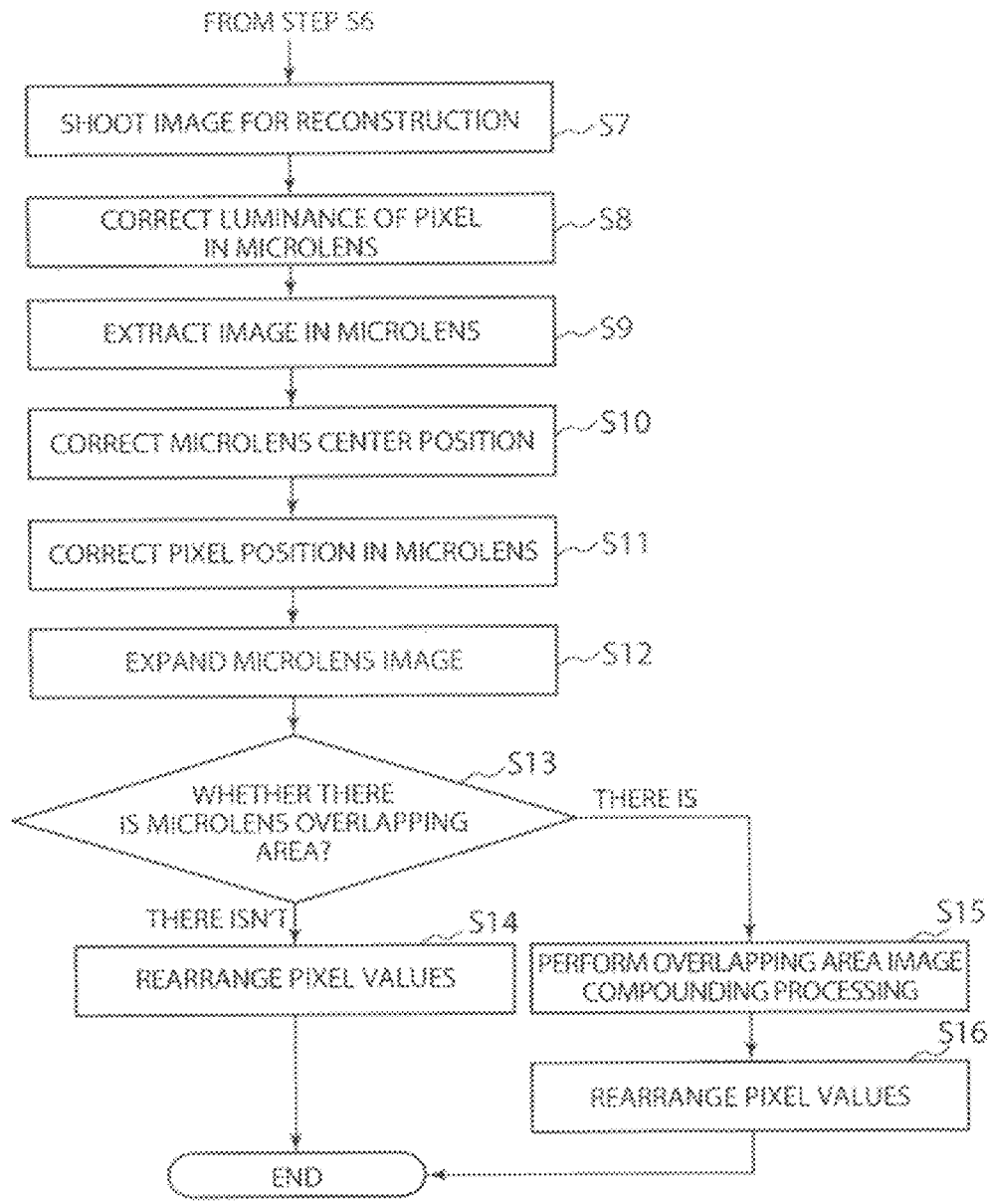
FIG. 3 is a flow chart showing a processing procedure of a signal processing unit.

First, an image for calibration is shot (step S1 in FIG. 2). Subsequently, the image for calibration which is shot is binarized (step S2 in FIG. 2). Contour fitting is performed on the binarized image (step S3 in FIG. 2). Then, a center position of each microlens is acquired (step S4 in FIG. 2). Subsequently, a pixel value in each microlens is acquired (step S5 in FIG. 2). A correction matrix is calculated from the center position of each microlens and the pixel value in each microlens (step S6 in FIG. 2). The procedure ranging from steps S1 to S6 is processing steps for finding the center position of the microlens and the correction matrix for image correction from the shot image. If the setting of the optical system does not change, then the same values can be used for the microlens center position and the correction matrix, and consequently the procedure ranging from steps S1 to S6 can also be omitted.

Reconstruction (correction) of the shot image is performed by using the correction matrix calculated in this way. A procedure of this reconstruction is shown in FIG. 3. First, an image for reconstruction is shot (step S7 in FIG. 3). Subsequently, correction of pixel luminance in a microlens is performed (step S8 in FIG. 3). Then, extraction of an image in the microlens is performed (step S9 in FIG. 3). Correction of the microlens center position is performed (step S10 in FIG. 3). Correction of the pixel position in the microlens is performed (step S11 in FIG. 3). Subsequently, expansion of the microlens image is performed (step S12 in FIG. 3). A decision is made whether an area where microlens images overlap is generated (step S13 in FIG. 3). If there is not an overlapping area, an image having pixel values of a microlens image rearranged according to positions after the correction is generated (step S14 in FIG. 3), and the signal processing is finished. If there is an overlapping area, image compounding processing is performed in the overlapping area (step S15 in FIG. 3). Then, an image having pixel values arranged at positions after the correction is generated (step S16 in FIG. 3) and the signal processing is finished.

(Details of Optical System)

Figure 4:
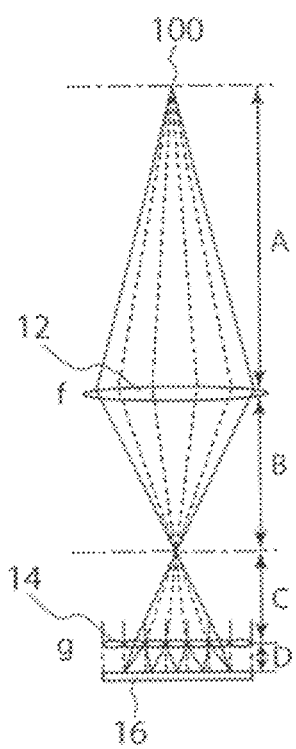
FIG. 4 is a diagram showing a concrete example of an optical system in a solid-state imaging device according to an embodiment.
Figure 5:
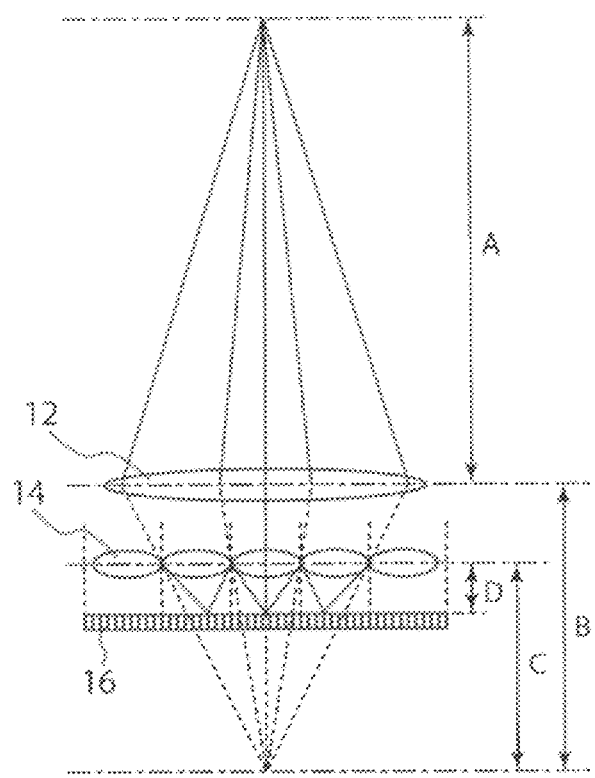
FIG. 5 is a diagram showing another concrete example of an optical system in a solid-state imaging device according to an embodiment.

An optical system in a solid-state imaging device in an embodiment is shown in FIG. 4. Light rays are incident on the image formation lens 12, the microlens array 14, and the imaging element 16, in the cited order. In FIG. 4, A represents a distance between the image formation lens 12 and an object 100, B represents a distance of image formation performed by the image formation lens 12, C represents a distance between the image formation plane of the image formation lens 12 and the microlenses in the microlens array 14, and D represents a distance between the microlens array 14, the imaging element 16, f represents a focal length of the image formation lens 12, and g represents a focal length of the microlenses. For the purpose of description, the object side with respect to the optical axis is herein defined as forward, and the imaging element side is defined as backward. In the optical system, the microlens array plays a role of separating light rays of the image formation lens to images of respective viewpoints and forming an image on the imaging element 16. Incidentally, in the present embodiment, the microlens array 14 is installed behind the image formation plane of the image formation lens 12 with respect to the image formation lens 12 as shown in FIG. 4. However, the present embodiment is not restricted to the condition shown in FIG. 4, but, for example, the microlens array 14 may be installed in front of the image formation plane of the image formation lens 12 as shown in FIG. 5.

(Method for Obtaining Correction Coefficients)

As regards the correction coefficients described in the processing procedure of the signal processing unit 26, a method for finding the correction coefficients will now be described with reference to FIGS. 6(a) and 6(b). FIG. 6(a) shows the optical system in the case where there is not optical distortion such as an attachment error, the microlens array 14 and the imaging element 16 are installed in parallel to each other, and an object is located on the optical axis. FIG. 6(b) is an expanded diagram of a part 13 including the microlens array 14 and the imaging element 16. In FIG. 6(b), a point at which the optical axis of the image formation lens 12 intersects a principal point of one microlens located in a plane center of the microlens array 14 is set as an origin O, the optical axis of the image formation lens 12 is taken as a Z axis, and in addition an X axis is taken in a plane perpendicular to the Z axis. Since the present optical system is axis-symmetrical about the optical axis of the image formation lens 12, an arbitrary X axis can be taken in the above-described arrangement. More strictly speaking, the number of directions in an axis symmetrical manner is finite depending upon the arrangement of the microlenses. If the microlenses are disposed in a hexagonal arrangement, six ways of rotation symmetry axis can be taken. If the microlenses are disposed in a square arrangement, four ways of symmetrical axis can be taken.

Figure 6:
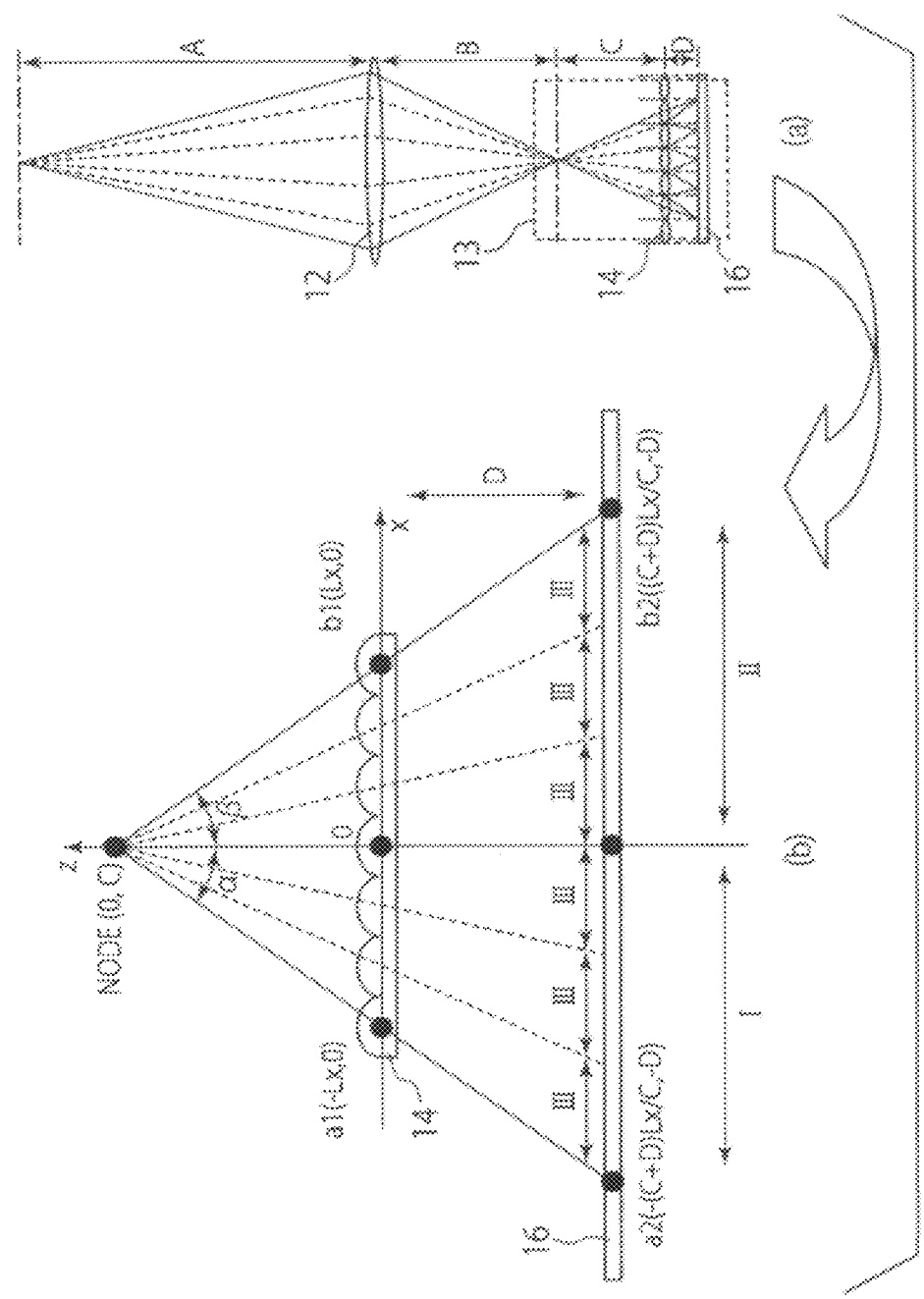
FIGS. 6(a) and 6(b) are diagrams for explaining a method for finding correction coefficients.

A coordinate of a principal point of a microlens on the X axis is denoted by Lx. A coordinate of a principal point of a microlens located at a symmetric position about the Z axis is denoted by −Lx. Angles formed by the Z axis and principal light rays of microlenses which are incident from a node (0, C) serving as an optical focusing point of the image formation lens 12, on points a1(−Lx, 0) and b1(Lx, 0) are denoted by $\alpha$ and $\beta$, respectively. Since $\alpha=\beta$, positions of respective light arrays arriving at the top of the imaging element become a point a2 and a point b2. Denoting a distance between the Z axis and a2 by I and a distance between the Z axis and b2 by II, it follows that I=II and the value of Lx can also be adapted to any microlens set located symmetrically about the Z axis on which light rays illuminated from the same node are incident. Denoting a distance between image centers of the microlenses on the imaging element 16 by III, therefore, it is appreciated that light rays passing through the centers of the microlenses appear on the imaging element 16 side by side uniformly as shown in FIG. 6(*b*).

Figure 7:
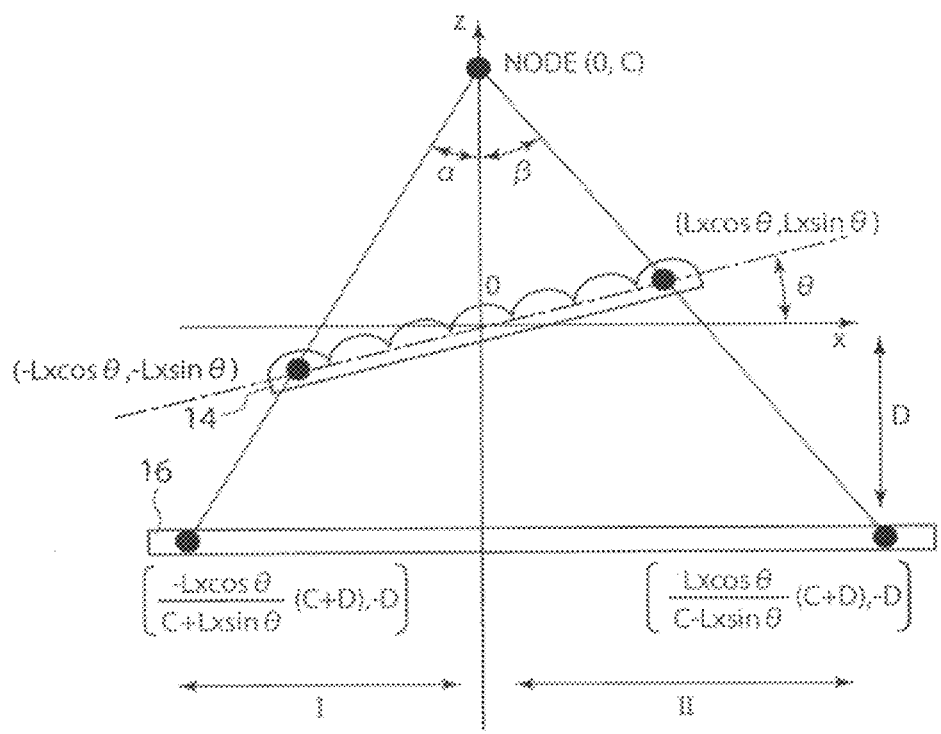
FIG. 7 is a diagram for explaining an image formation position relation of a center of a set of microlenses in a state in which a microlens array is inclined with respect to an imaging element.

On the other hand, image formation position relations of centers in a set of microlenses located symmetrically about the Z axis in a state in which the microlens array 14 is inclined from the imaging element 16 by an angle θ in the XZ plane as shown in FIG. 7 will now be calculated. As for the angle θ, the X axis is taken as reference, and a direction in which the Z axis is rotated toward the Z axis counterclockwise is taken as positive. In this case, the center coordinates a1 and b1 of a microlens located at the distance Lx from the origin O which corresponds to the inclination angle θ can have a value other than 0 in the Z axis direction. For example, if θ>0, it follows that α<β, and therefore, I<II. As a result, image formation positions on the imaging element 16 do not become equal distances from the origin. If the microlens array 14 is inclined, therefore, image centers of the microlenses distribute unevenly on the imaging element 16.

Figure 8:
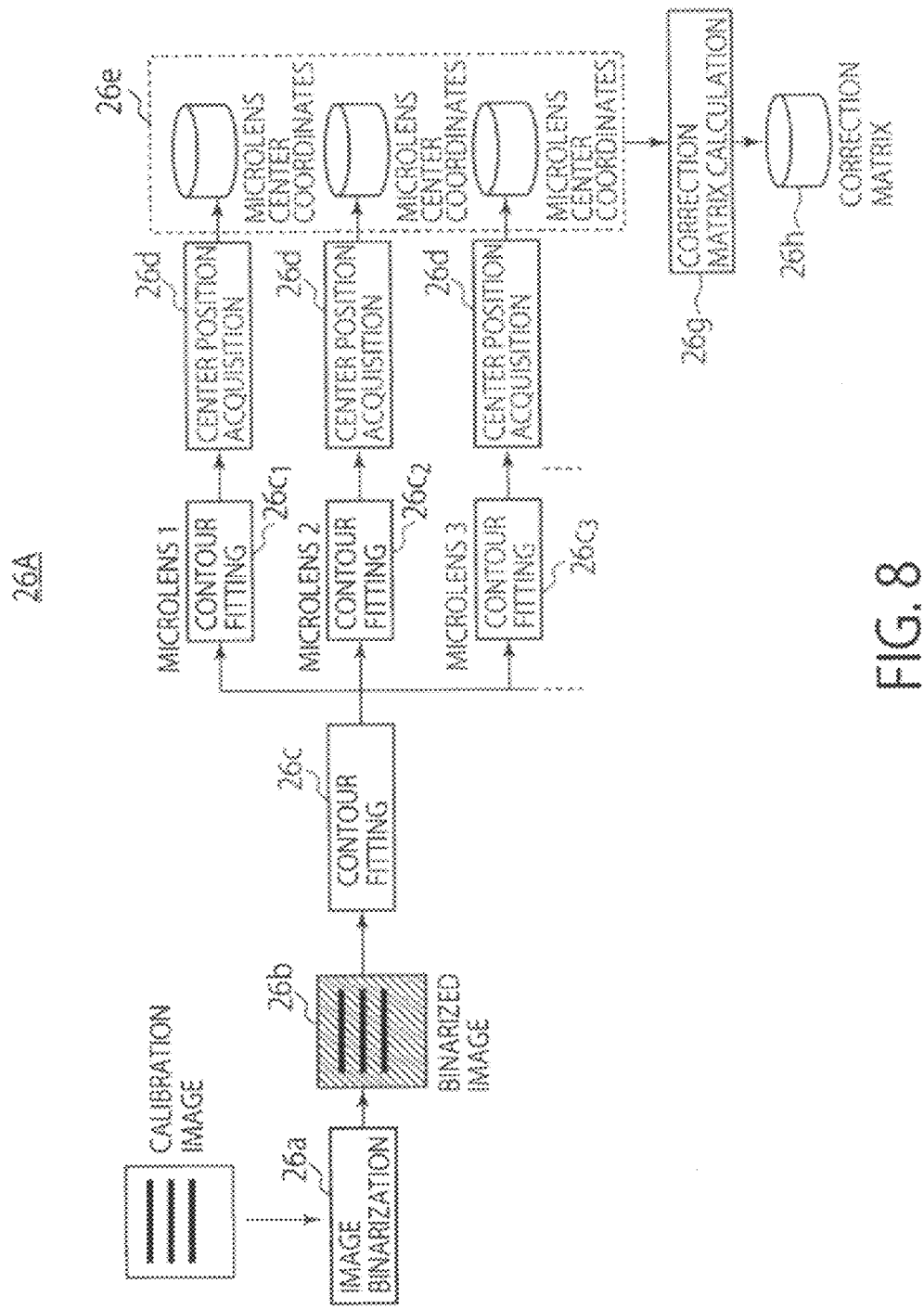
FIG. 8 is a diagram for explaining the case where the correction coefficients are calculated by using an obtained image itself in the case where the image formation positions of microlenses distribute unevenly.

In the case where the image formation positions of the microlenses distribute unevenly, correction coefficients are found by using an obtained image itself in order to correct the distortion in the optical system. Specifically, as shown in FIG. 8, a correction coefficient calculation unit 26A in the signal processing unit 26 determines the center position of the image of each microlens on the basis of the shot image by using a known technique, for example, circular contour matching or the like, and estimates a correction matrix which corrects the optical distortion parameters on the basis of arrangement of center coordinates. Incidentally, since the shape of the microlens image reflects the shape of the diaphragm, a general image having rectangular microlens images arranged therein is obtained in the imaging element 16 in the case where the diaphragm takes a rectangular shape. Therefore, the precision in determining the center position is improved by changing the matching shape according to the diaphragm shape.

Hereafter, details of operation of the correction coefficient calculation unit 26A will be described. First, a binarization processing unit 26*a* performs binarization on a shot image for calibration. The binarized image is stored in a memory 26*b*. Subsequently, a contour fitting unit 26*c* performs contour fitting by using the binarized image. The contour fitting is performed for each microlens. Microlens contour fitting units 26*c*₁, 26*c*₂, 26*c*₃ and so on perform the contour fitting on microlenses, respectively. Then, a center position acquisition unit 26*d* performs acquisition of a center position of a microlens image on the basis of these contour fitting operations, and respective center positions are stored in a memory 26*e*. A correction matrix calculation unit 26*g* calculates a correction matrix on the basis of the center position of each microlens image, and the correction matrix is stored in a memory 26*h*.

The correction matrix is calculated as described hereafter. Referring back to FIG. 7, if the microlens array 14 is inclined by θ degrees and coordinates of at least three center positions of microlenses images are known, the inclination angle θ and a node position C can be found. For simplicity, it is supposed that one of image formation center points of the microlenses exists at an intersection (0, −D) of the Z axis and the imaging element 16 and in addition coordinates of image formation points respectively of points a2 and b2 are known. Distances I and II between image formation centers of the microlenses can be represented by the following equation.

$$I = \frac{Lx\cos\theta}{C + Lx\sin\theta}(C + D)$$

$$II = \frac{Lx\cos\theta}{C - Lx\sin\theta}(C + D)$$

Figure 9:
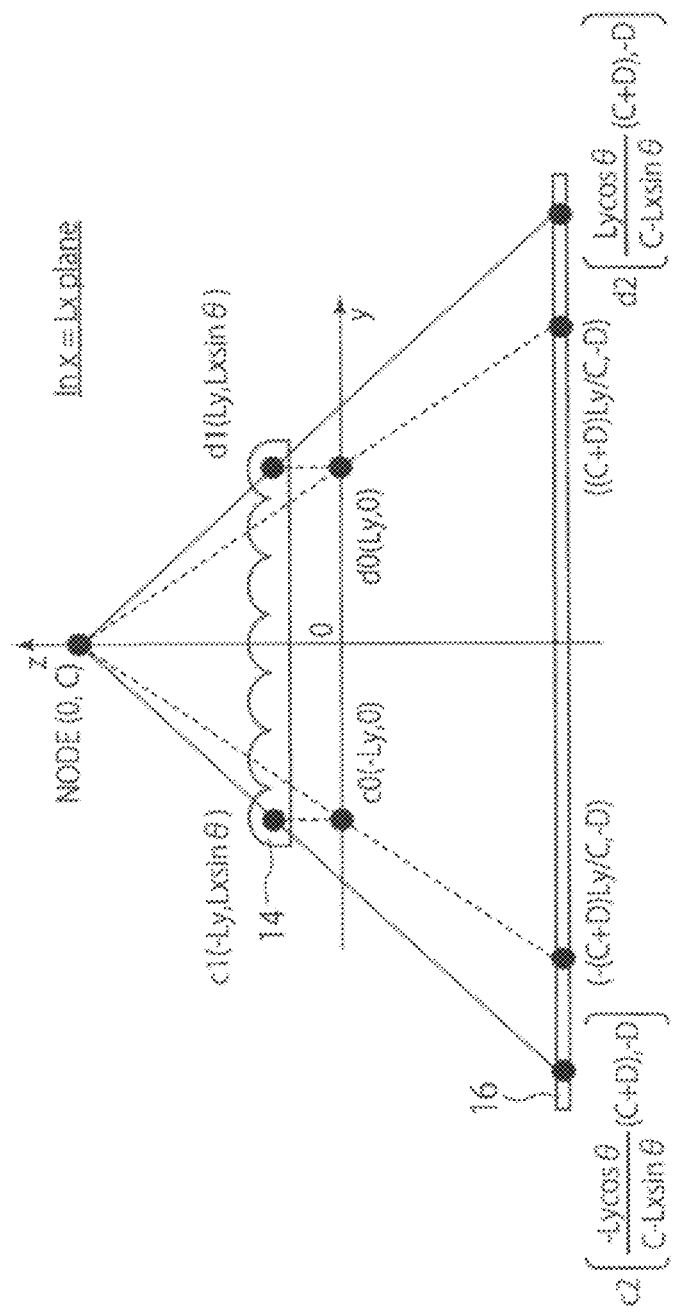
FIG. 9 is a diagram for explaining position relations of microlenses in a Y axis direction.

Therefore, it is possible to obtain values of the inclination angle θ and the node position C by solving the two simultaneous equations. Paying attention to a change in a Y axis direction perpendicular to the X axis and the Y axis, position relations of the microlenses in an x=Lx plane are represented as shown in FIG. 9 and it is appreciated that a y coordinate of the center position also changes. In the case in the x=Lx plane, the plane of the microlens array 14 exists at z=Lx·sin θ and consequently the image formation positions c0 and d0 move to image formation positions c2 and d2, respectively. Changes of x and y coordinates of such image formation points can be converted to coordinates in the case where there is no inclination of the microlens array 14, by using the correction matrix. Here, a center position coordinate lx of a microlens having a sign is introduced instead of Lx. In other words, in the points a1 and b1, a point satisfying x>0 is represented as lx=Lx and a point satisfying x<0 is represented as lx=−Lx. Letting an image formation position of a microlens in an ideal state having no inclination be $(x_1, y_1, z_1)$ and Letting an image formation position of the microlens in a state having an inclination be $(x_2, y_2, z_2)$, position correction can be performed by using the following equation.

$$\begin{pmatrix} x_1 \\ y_1 \\ z_1 \end{pmatrix} = \begin{pmatrix} \frac{C - lx\sin\theta}{C\cos\theta} & 0 & 0 \\ 0 & \frac{C - lx\sin\theta}{C} & 0 \\ 0 & 0 & 1 \end{pmatrix} \begin{pmatrix} x_2 \\ y_2 \\ z_2 \end{pmatrix}$$

It is possible to find a correction matrix as to separately occurring inclination and distortion of the imaging element 16 as well by using a similar technique, apply them, and thereby correct the processed image.

Figure 10:
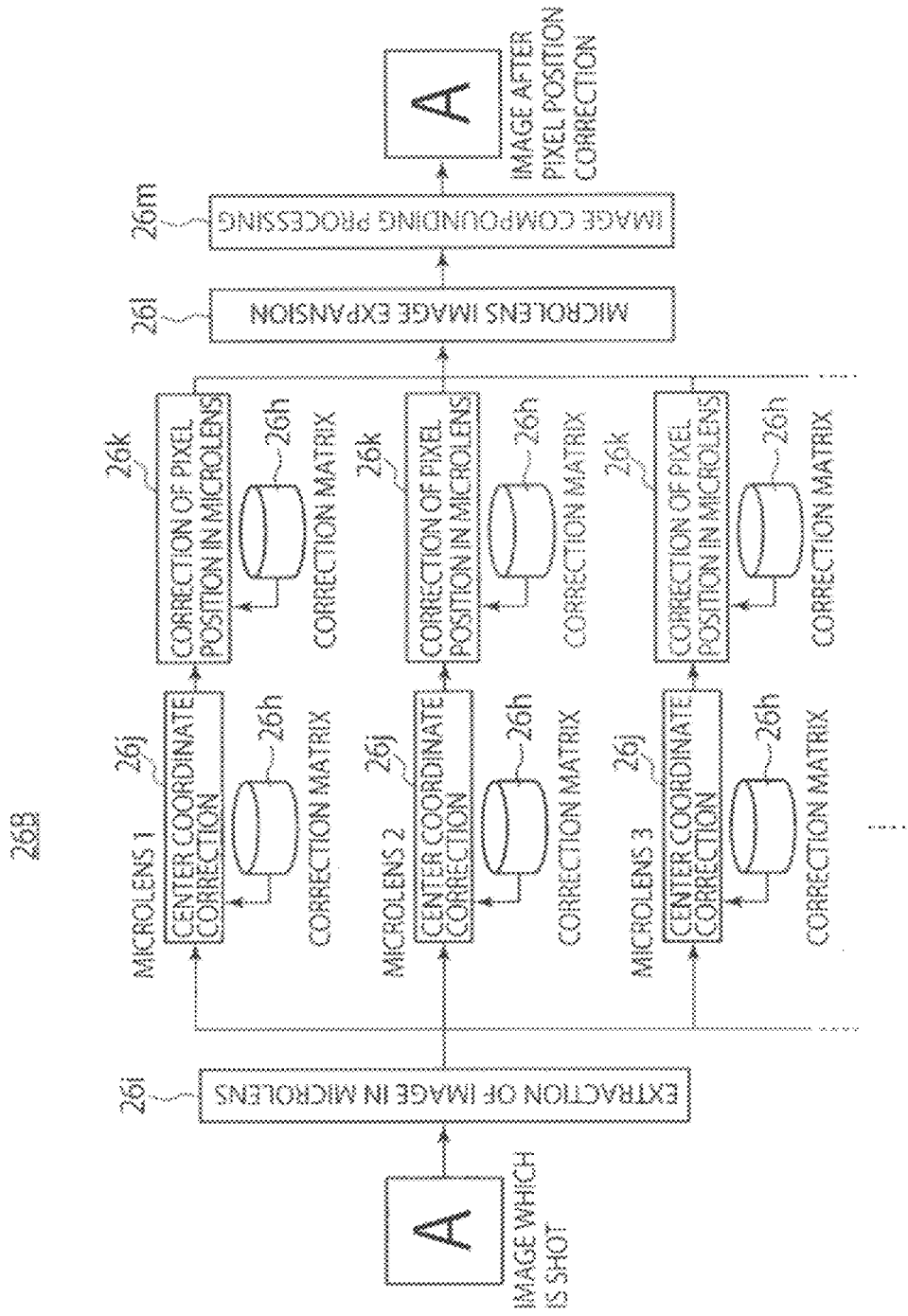
FIG. 10 is a diagram for explaining the case where a pixel position is corrected by using a correction matrix.

The case where the pixel position is corrected by using the correction matrix found as described above will now be described with reference to FIG. 10. The correction of the pixel position is performed by a pixel position correction unit 26B in the signal processing unit 26. First, an image extraction unit 26*i* in the pixel position correction unit 26B performs extraction of an image in each microlens. Subsequently, a center coordinate correction unit 26*j* performs correction of a center position, i.e., center coordinates of each microlens on the basis of the extracted image by using the correction matrix stored in the memory 26*h*. Then, an intra-microlens pixel position correction unit 26*k* performs correction of pixel positions in each microlens by using the correction matrix stored in the memory 26*h*. Subsequently, a microlens image expansion unit 26*l* performs expansion of the image of the microlens. In the case where pixel rearrangement is not performed, an image after the pixel position correction is obtained from the expanded microlens image. In the case where pixel rearrangement is performed, an image compounding processing unit 26*m* performs image compounding processing to obtain an image after pixel position correction.

In the pixel position correction, the correction matrix can be re-utilized as it is, under a condition that the state of the optical system does not change. In imaging apparatuses having a fixed focus such as, for example, portable cameras, therefore, merits such as processing time shortening and processing resource saving can be obtained by previously finding a correction matrix for correcting optical distortion caused by assembling errors, part dispersion, and the like at the time of shipping and using the found correction matrix at the time of shooting.

(Method for Performing Luminance Value Correction)

Figure 11:
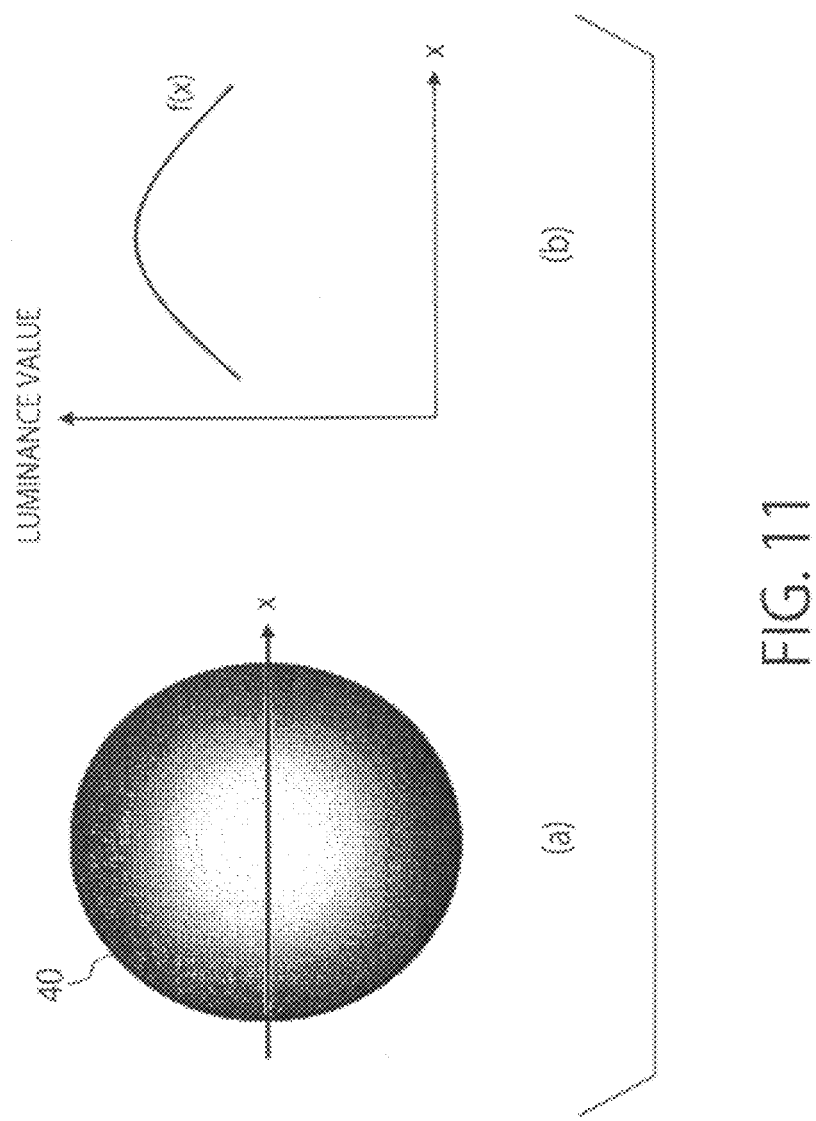
FIGS. 11(a) and 11(b) are diagrams for explaining luminance value distribution in a peripheral part of a microlens.
Figure 12:
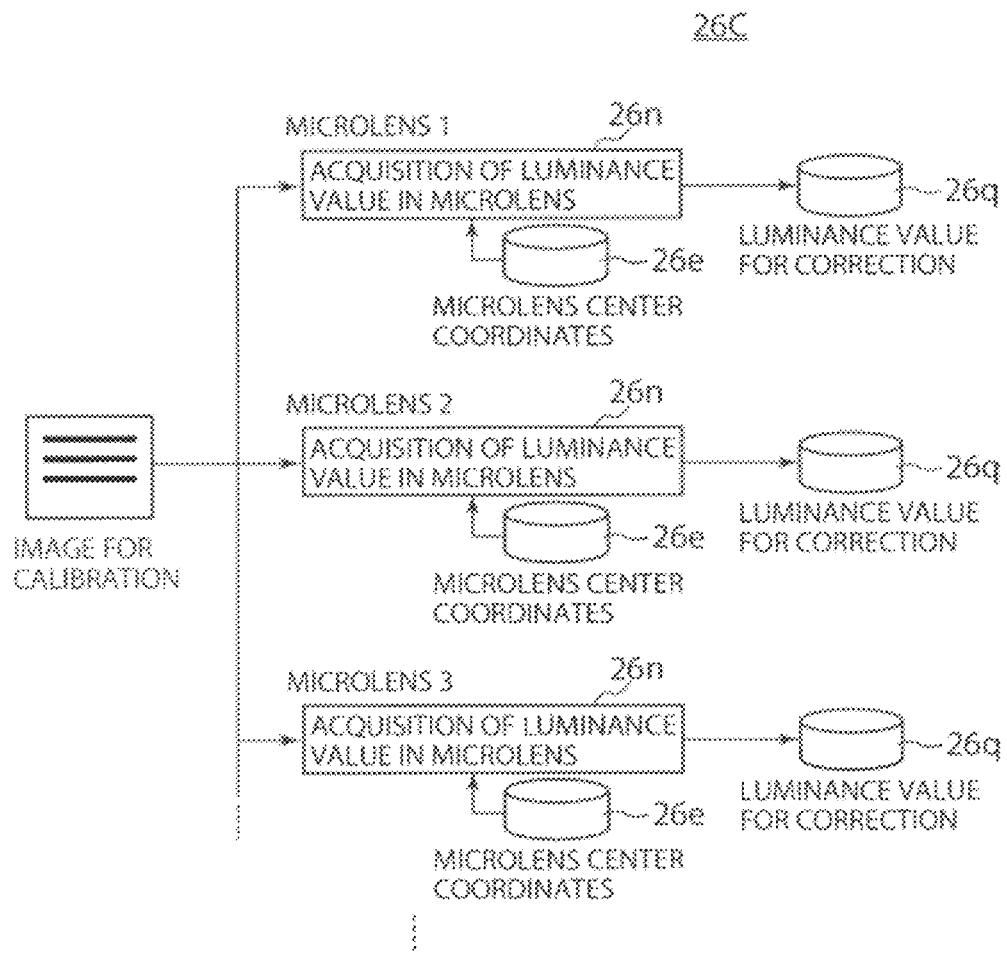
FIG. 12 is a diagram for explaining acquisition of a luminance value for correction with respect to each microlens.

The image formed by a microlens and obtained by the imaging element 16 shown in FIG. 11(*a*) exhibits luminance value distribution having a peak as shown in FIG. 11(*b*) because of light quantity falling in a peripheral part of each microlens. In addition, microlens images differ in magnitude and position of light quantity peak because of shape distortions and the like of microlenses. If the compounding processing for image reconstruction is performed in this state, there is a possibility that picture quality degradation will be caused by influence of luminance value peak. As shown in FIG. 12, therefore, a luminance correction unit 26C in the signal processing unit 26 previously shoots an image for calibration such as a white plate and stores it into a memory, and performs processing for reducing the influence of the light quantity peak by using the image for calibration at the time of compounding processing. Supposing that the light quantity peak can be represented as a function f(x) of a coordinate x as a result of addition of light quantity falling to the luminance value of the white plate, the original luminance value can be restored by finding an inverse function $f^{-1}(X)$ of f(x).

Figure 13:
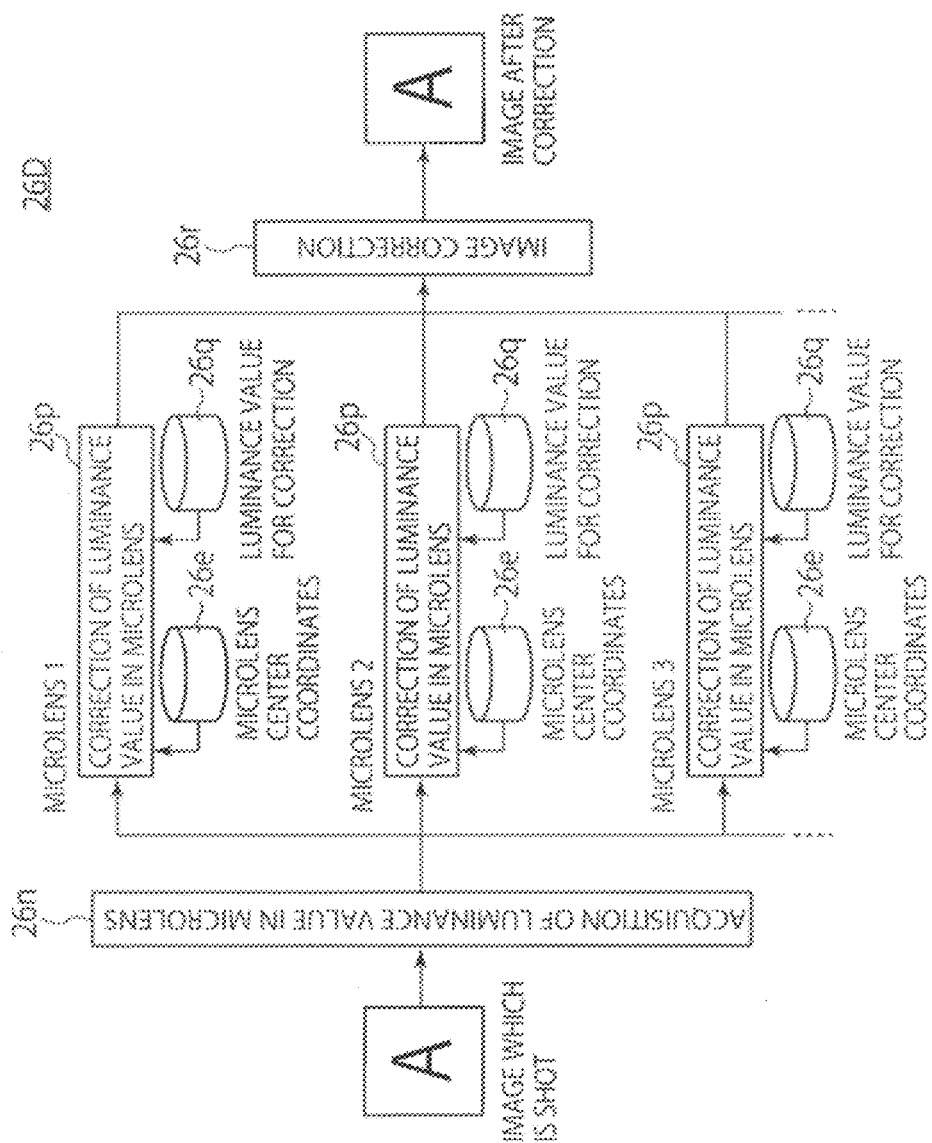
FIG. 13 is a diagram for explaining the case where an image picked up is corrected on the basis of a luminance value for calibration in a memory.

Operation of the luminance correction unit 26C will now be described with reference to FIG. 12. First, a luminance value acquisition unit 26n acquires a luminance value in each microlens from the image for calibration on the basis of the microlens center coordinates stored in the memory 26e. Subsequently, the acquired luminance value is stored in a memory 26q as a luminance value for correction. Then, as shown in FIG. 13, a luminance correction unit 26D in the signal processing unit 26 performs luminance correction on an image picked up. In other words, the luminance value acquisition unit 26n acquires a luminance value in each microlens from the image picked up. Subsequently, a luminance value correction calculation unit 26p performs calculation of a luminance correction value in each microlens on the basis of the acquired luminance value, the microlens center coordinates stored in the memory 26e, and the luminance value for correction stored in the memory 26q. Then, an image correction unit 26r corrects the image picked up on the basis of the luminance correction value.

(Method for Obtaining Distance Image Information)

A method for obtaining distance image information will now be described by taking the optical system shown in FIG. 4 as an example. If the distance A between the lens 12 and the object 100 changes, then a value of B also changes in accordance with the following equation.

$$\frac{1}{A} + \frac{1}{B} = \frac{1}{f}$$

If a distance between the image formation lens 12 and the microlens array 14 is fixed to a value E, then a value of C also changes as B changes.

$$B+C=E$$

On the other hand, as regards the microlens 14, C and D are related by the following equation.

$$\frac{1}{C} + \frac{1}{D} = \frac{1}{g}$$

As a result, an image obtained by reducing an image formation plane which is a virtual image of the image formation lens 12 to M (where M=D/C) times is obtained as an image formed through each microlens, and it is represented by the following equation.

$$\frac{D}{C} = \frac{D}{E-B} = \frac{D}{E - \frac{Af}{A-f}} = \frac{D(A-f)}{E(A-f) - Af} = M$$

Rearranging the above Equation with respect to A, we get the following equation.

$$A = \frac{(D-ME)f}{D - ME + Mf}$$

If the image reduction magnification M in the microlens is calculated by matching or the like and values of D and E are measured previously, then the value of A can be calculated inversely.

According to the present embodiment, each microlens image forming position with the errors and distortion in the optical system reflected is previously estimated and the correction coefficient matrix is calculated as described heretofore. It becomes possible to improve the image alignment precision at the time of reconstruction and picture quality degradation can be prevented by performing the correction of the microlens array and the correction of the microlens image together by use of the correction coefficient matrix.

Furthermore, it becomes possible to prevent the precision in the estimation of the distance to the object from falling by acquiring the correction coefficients and utilizing them in the processing.

Furthermore, it becomes possible to prevent picture quality degradation such as image distortion in the reconstructed image by utilizing the correction coefficients.

Correction coefficients of each imaging apparatus itself are utilized. Even if errors such as, for example, attachment errors at the time of manufacturing which differ from apparatus to apparatus occur, therefore, influence of them upon the reconstructed image can be reduced.

In other words, according to the present embodiment, it is possible to provide a solid-state imaging device capable of performing the correction easily and suppressing errors and picture quality degradation in the distance estimation and image reconstruction even if the apparatus has a plurality of microlenses.

Figure 14:
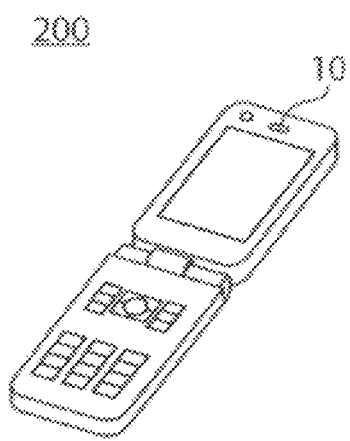
FIG. 14 is a diagram showing a portable information terminal using a solid-state imaging device.

Incidentally, the solid-state imaging device 1 according to the present embodiment can be used not only in a still camera but also in a portable information terminal such as, for example, a portable information terminal 200 shown in FIG. 14. The portable information terminal shown in FIG. 14 is nothing but an example, and reference numeral 10 denotes an imaging module unit in the solid-state imaging device according to the first or second embodiment.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. A solid-state imaging device comprising:
a first optical system configured to form an image of an object on an image formation plane;
an imaging element comprising an imaging area which includes a plurality of pixel blocks each including a plurality of pixels;
a second optical system configured to include a microlens array including a plurality of microlenses provided to correspond to the plurality of pixel blocks and reduce and re-form an image scheduled to be formed on the image formation plane, in a pixel block corresponding to an individual microlens; and
a signal processing unit configured to perform image signal processing with an optical position relation between each microlens and the pixel block corrected, by using an image signal of the object obtained by the imaging element, the signal processing unit comprising:
a center position acquisition unit which acquires a center position of image formation of each microlens in the microlens array from an image for calibration; and
a correction matrix calculation unit which calculates a correction matrix on the basis of the center position of image formation of each microlens acquired by the center position acquisition unit and a pixel value.

2. The device according to claim 1, wherein the signal processing unit comprises a correction coefficient calculation unit which calculates correction coefficients from the image for calibration to correct distortion of at least one of the second optical system and the imaging element, and the signal processing unit processes the image signal by using the correction coefficients to correct the optical position relation between each microlens and the pixel block corrected.

3. The device according to claim 1, wherein
the signal processing unit further includes a pixel value acquisition unit which acquires a pixel value in each microlens, and
a pixel position in each microlens is corrected from an image signal of a shot image on the basis of the center position of image formation of each microlens acquired by the center position acquisition unit, a pixel value in each microlens acquired by the pixel value acquisition unit and a correction matrix calculated by the correction matrix calculation unit.

4. The device according to claim 1, wherein the signal processing unit corrects a luminance value of an image signal of a shot image on the basis of correction data for luminance calibration.

5. A portable information terminal comprising the solid-state imaging device according to claim 1.

6. The terminal according to claim 5, wherein the signal processing unit comprises a correction coefficient calculation unit which calculates correction coefficients from an image for calibration to correct distortion of at least one of the second optical system and the imaging element, and the signal processing unit processes the image signal by using the correction coefficients to correct the optical position relation between each microlens and the pixel block corrected.

7. The terminal according to claim 5, wherein
the signal processing unit further includes a pixel value acquisition unit which acquires a pixel value in each microlens, and
a pixel position in each microlens is corrected from an image signal of a shot image on the basis of the center position of image formation of each microlens acquired by the center position acquisition unit, a pixel value in each microlens acquired by the pixel value acquisition unit and a correction matrix calculated by the correction matrix calculation unit.

8. The terminal according to claim 5, wherein the signal processing unit corrects a luminance value of an image signal of a shot image on the basis of correction data for luminance calibration.

* * * * *